(12) United States Patent
Plater-Zyberk et al.

(10) Patent No.: US 11,368,423 B1
(45) Date of Patent: Jun. 21, 2022

(54) RESOURCE RECOMMENDATIONS IN ONLINE CHAT CONVERSATIONS BASED ON SEQUENCES OF TEXT

(71) Applicant: SUPPORTIV INC., Berkeley, CA (US)

(72) Inventors: Helena Plater-Zyberk, Oakland, CA (US); Pouria Mojabi, Oakland, CA (US)

(73) Assignee: SUPPORTIV INC., Berkeley, CA (US)

( * ) Notice: Subject to any disclaimer, the term of this patent is extended or adjusted under 35 U.S.C. 154(b) by 0 days.

(21) Appl. No.: 17/565,068

(22) Filed: Dec. 29, 2021

(51) Int. Cl.
*H04L 51/42* (2022.01)
*H04L 51/00* (2022.01)
*G06N 20/00* (2019.01)
*G06F 16/33* (2019.01)
*G06N 3/02* (2006.01)
*G06F 16/31* (2019.01)
*G06Q 30/06* (2012.01)
*G06F 16/335* (2019.01)

(52) U.S. Cl.
CPC ............. *H04L 51/22* (2013.01); *G06F 16/31* (2019.01); *G06F 16/33* (2019.01); *G06F 16/335* (2019.01); *G06N 3/02* (2013.01); *G06N 20/00* (2019.01); *G06Q 30/0631* (2013.01); *H04L 51/16* (2013.01)

(58) Field of Classification Search
None
See application file for complete search history.

(56) References Cited

U.S. PATENT DOCUMENTS

| | | | |
|---|---|---|---|
| 8,484,225 B1 | 7/2013 | Datta et al. | |
| 10,650,311 B2 * | 5/2020 | Henry | G06F 16/3322 |
| 10,657,676 B1 * | 5/2020 | Rehfeld | G06N 3/0454 |
| 11,017,167 B1 * | 5/2021 | Podgorny | G06F 16/951 |
| 11,250,039 B1 * | 2/2022 | Chang | G06F 16/3334 |
| 2010/0057857 A1 | 3/2010 | Szeto | |
| 2010/0205541 A1 | 8/2010 | Rapaport et al. | |
| 2015/0156154 A1 * | 6/2015 | Russell | H04L 51/18 704/231 |
| 2017/0180497 A1 * | 6/2017 | Comstock | G06Q 30/0201 |
| 2018/0157758 A1 * | 6/2018 | Arrizabalaga | G06N 3/08 |
| 2018/0174037 A1 * | 6/2018 | Henry | G06F 16/338 |
| 2019/0349441 A1 * | 11/2019 | Comstock | H04L 67/02 |
| 2019/0362253 A1 | 11/2019 | Francis et al. | |
| 2020/0117649 A1 * | 4/2020 | Arnold | G06F 16/244 |
| 2020/0327190 A1 * | 10/2020 | Agrawal | G06F 40/216 |
| 2021/0294781 A1 * | 9/2021 | Fernández Musoles | G06F 16/3329 |
| 2021/0328888 A1 | 10/2021 | Rath | |
| 2021/0334300 A1 * | 10/2021 | Banda | G06F 16/3347 |

* cited by examiner

*Primary Examiner* — Ranodhi Serrao
(74) *Attorney, Agent, or Firm* — Baker Botts L.L.P.

(57) ABSTRACT

A dense passage retrieval machine learning model having a first encoder for resources and a second encoder for messages can automatically match relevant resources to computers or sessions based on analysis of a series of messages of an online chat conversation. Continuous re-training is supported based on feedback from a moderator computer and/or user computers.

22 Claims, 6 Drawing Sheets

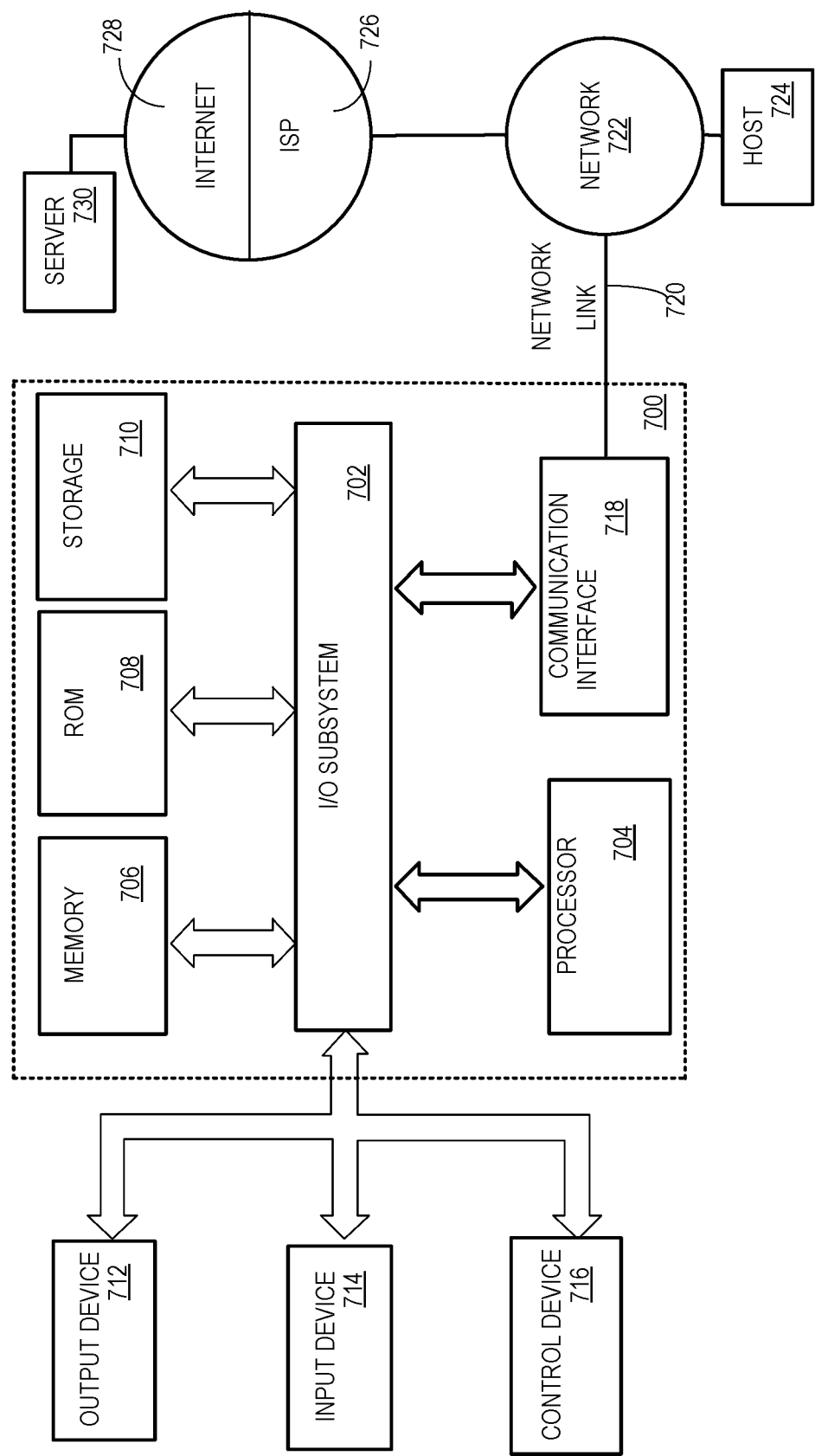

RESOURCE RECOMMENDATIONS IN ONLINE CHAT CONVERSATIONS BASED ON SEQUENCES OF TEXT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021 Supportiv Inc.

TECHNICAL FIELD

One technical field of the present disclosure is computer-implemented machine learning as applied to similarity matching for pairs of items, including neural network architectures, dense passage retrieval (DPR) models and TRANSFORMER-based models. Another technical field is processing natural language input from online conversations, such as electronic chat conversations, using machine learning models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data scientists have developed a variety of computer-implemented techniques for inspecting natural language text, such as a query, with records in a digital database. The conventional approach to this task is unsupervised text retrieval. A query and existing data are encoded using an encoder such as word2vec, doc2vec, LDA or tf-idf. The computer is programmed to consecutively quantify the similarity between the encoded vectors using a similarity metric such as cosine. This approach is suboptimal because it is unsupervised, and thus does not allow for training the model on the specific task and data. Furthermore, the unsupervised nature of these approaches does not permit continuous improvement by updating its training set to address past errors.

Online conversation systems, such as electronic chat rooms, have become widely used. General-purpose examples include MESSENGER, WHATSAPP, REDDIT, SLACK, ACQUIRE.IO, and ZENDESK. Recently SMS messaging is also used for conversation and a general-purpose example includes COMCAST. Use of chat rooms can involve a succession of related, short messages. However, the conventional machine learning approaches for processing queries contained in chat messages suffer from the drawback of explicit reliance on a single input query for the purpose of classification or matching. This approach is suboptimal because the typical electronic chat conversation involves multiple messages that often are related by a common context or topic.

SUMMARY

The appended claims may serve as a summary of the invention.

BRIEF DESCRIPTION OF THE DRAWINGS

In the drawings:

FIG. 7 illustrates a computer system with which one embodiment could be implemented.

DETAILED DESCRIPTION

Figure 1:
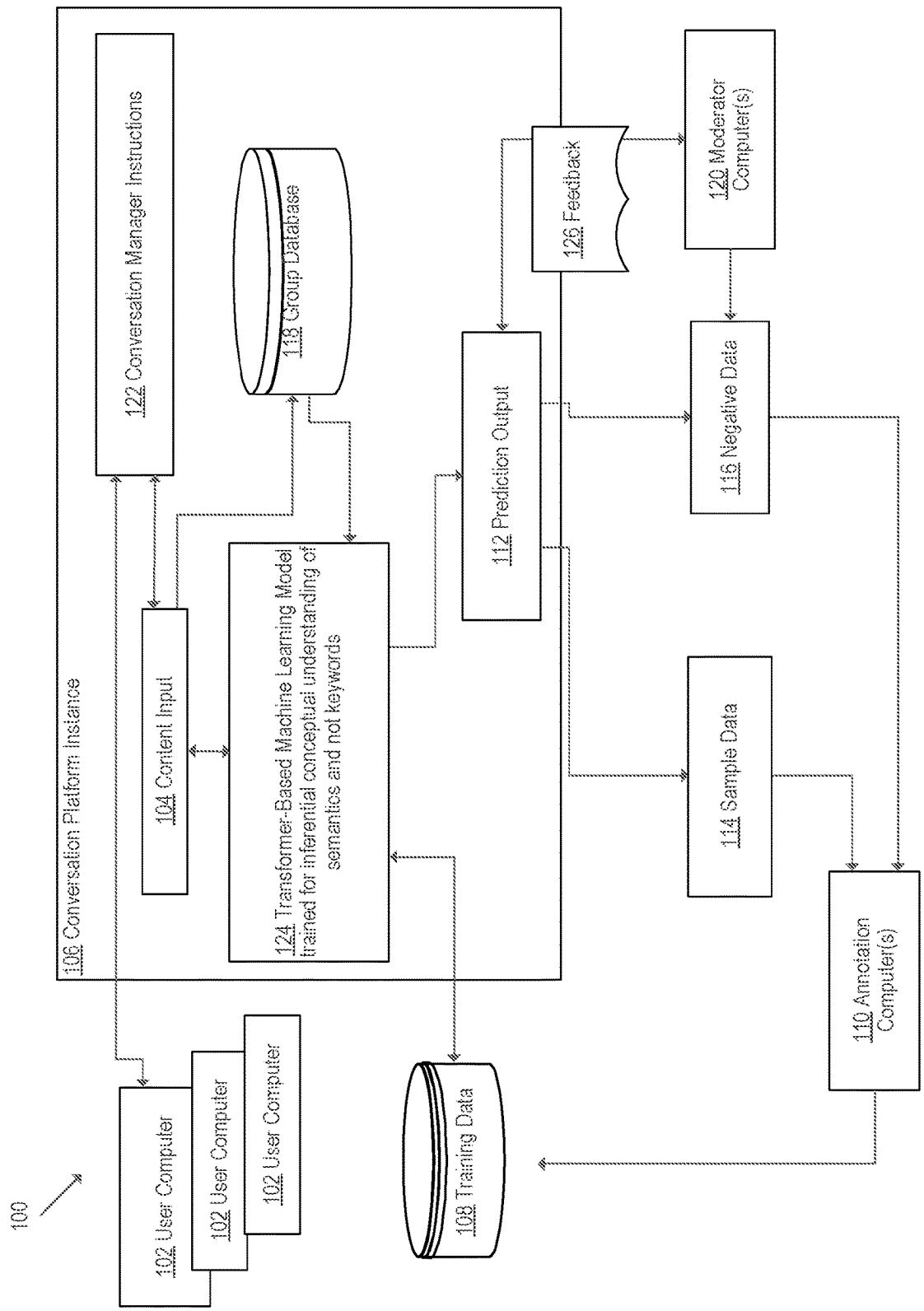
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview

1. General Overview

In one embodiment, a dense passage retrieval machine learning model having a first transformer-based encoder for resources and a second transformer-based encoder for messages can automatically match and recommend relevant resources to computers or sessions involved in online chat conversations based on analysis of a series of messages of a particular online chat conversation. In some embodiments, recommended resources are subject to approval by a moderator before the resources are shared with users. In either approach, continuous re-training is supported based on feedback from a moderator computer and/or user computers, but continuous retraining is not required in all embodiments.

Certain embodiments of a conversation platform instance are described herein as being programmed to facilitate discussions of mental health concerns of users, of user computers, or user accounts. However, the techniques disclosed herein are not limited to that domain. Instead, the techniques disclosed herein apply to any domain of healthcare or of conversational commerce. For example, an embodiment could be configured to facilitate conversations about healthcare treatment pathways, or resources. "Resources," in this context, may mean articles, videos, audio content, products, services, educational materials or self-help tools among people interested in discussing a topic, need, interest, or hobby, in real-time (concurrently) or asynchronously.

As a specific commercial example, an embodiment could be configured to facilitate conversations about home stereo equipment in which user computers communicate chat conversations about what they are seeking in a chat with or without a moderator present; as conversations occur, suggestions to resources or hyperlinks to products meeting the discussed criterion appear or pop up, allowing all participants (or a subset, based on the participants' privileges) in the conversation to see the resources, exchange ideas or questions about specifications or uses, and/or make purchases as conversations are ongoing. Any commercial domain that can benefit from matching of conversations to resources can use the techniques disclosed herein.

In an embodiment, a conversation platform instance can be programmed to interpret emotional needs expressed via user computers, using contextual understanding rather than being dependent on keywords, and to support those needs by matching the most relevant resources that may help resolve expressed emotional needs. Embodiments can, however, use keywords or structured text and a basis of training or evaluation to generate recommendations of relevant resources. In some embodiments, the disclosure provides a technical solution for sharing digitally stored electronic resources in online chat conversations in real-time as a chat system receives messages from users; however, recommendation of resources can occur asynchronously in relation to messages or other communications, or within asynchronous message exchanges between users. Certain examples in the description focus on healthcare and retail domains, but other embodiments can be used in connection with serving advertising of products, based on keywords or contextual understanding. Embodiments can be implemented with a moderator present, or with no moderator.

In some embodiments, the disclosure provides a technical solution for matching resources without depending upon keywords in messages of a conversation; instead, artificial intelligence-based models are programmed to understand the meaning and context of messages, and to recommend or match the correct resources based upon output of those models. Recommendations and matching can occur in real-time as a chat system receives messages from users, or asynchronously in response to queries, calls, or other programmatic interaction with other applications or platforms.

In one aspect, a computer-implemented method comprises using a first computer, training a dense passage retrieval machine learning model having a first encoder for resources and a second encoder for messages; accessing a plurality of digitally stored resources, encoding the resources using the first encoder to generate a plurality of output resource encodings, and creating and storing an index based on the output resource encodings; receiving, from a second computer, a series of messages and encoding the series of messages using the second encoder to output a plurality of message encodings; forming a search query using the plurality of message encodings and querying the index using the search query; receiving a result set that identifies a set of relevant resources that are most similar to the plurality of message encodings; forming and transmitting display instructions which, when rendered using the second computer, cause the second computer to present the relevant resources.

In one feature of this aspect, the method further comprises, before forming and transmitting the display instructions, executing a threshold-based optimization to exclude non-relevant resources and output a set of recommended resources. In another feature, the index is a FAISS flat index. In a further feature, the method further comprises accessing the resources and pre-processing the resources to identify and store text excerpts and titles of the resources as metadata items in association with records of the resources; performing the encoding using the text excerpts and titles of the resources and the first encoder to generate the plurality of output resource encodings.

In still another feature, the method further comprises receiving input from a moderator computer, the input identifying a set of recommended resources based on the relevant resources; forming and transmitting the display instructions which, when rendered using the second computer, cause the second computer to present the set of recommended resources based on the relevant resources. In another feature, the method further comprises using a first computer, operating a plurality of different online chat conversations, each of the online chat conversations is associated with different third computers, each of the online chat conversations is associated with two or more content items; forming and transmitting display instructions which, when rendered using the moderator computer, cause the moderator computer to display, on a first display device of the moderator computer and near a particular message among the series of messages of a particular online chat conversation, a visual graphic indication that a particular resource is available; receiving, from the moderator computer, first input signaling a first selection of the visual graphic indication, and in response thereto, causing displaying one or more first graphical tiles on the first display device, each of the graphical tiles representing one resource in the set of recommended resources; receiving, from the moderator computer, second input signaling a second selection one of the graphical tiles, and in response thereto, causing displaying, on a second display device of the second computer and near a particular message among the series of messages of the particular online chat conversation, a second graphical tile representing the one resource in the set of recommended resources.

In yet another feature, each of the resources is stored in association with one or more access controls, and the method further comprises causing the displaying the second graphical tile only when the second computer is associated with at least one access control privilege that matches one or more of the access controls of the one resource.

In other features, the series of messages is associated with an online chat conversation and comprises content identifying one or more personal struggles; the series of messages is associated with an online chat conversation comprises 64 to 512 messages that were input by the second computer; each of the encoders comprises a transformer-based encoder or a BERT encoder; the result set includes one or more excerpts of each of the resources, the learning model having extracted the one or more excerpts to address the plurality of message encodings; and/or the result set includes one or more excerpts of each of the resources, the learning model having extracted the one or more excerpts to address the plurality of message encodings.

Other aspects, features, and embodiments will become apparent from other sections and/or drawing figures of the disclosure as a whole.

2. Structural & Functional Overview

2.1 Structural Overview

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

Computer system 100 can comprise a plurality of user computers 102 coupled directly or directly via one or more networks to a conversation platform instance 106, which also is coupled to a training database 108, optionally one or more moderator computers 120 and one or more annotation computers 110. Each of the user computers 102, moderator computers 120, and annotation computers 105 comprises any of a desktop computer, laptop computer, tablet computer, smartphone, or other computing device and may be coupled directly or indirectly via one or more network links. Each of the user computers 102, moderator computers 120, and annotation computers 105 can be implemented as shown for computer system 700 (FIG. 7).

User computers 102 can be associated with end users who interact with services that conversation platform instance 106 provides, including but not limited to interactive chat conversations in a particular domain. Moderator computers 120 can be associated with other end users who are responsible to moderate and guide the content of chat conversations, view recommended resources, direct or open resources for access to the user computers 102 during a chat conversation, provide feedback concerning the matching of user computers to chat conversations, provide feedback concerning the relevance of recommended resources to a chat conversation, and other functions as described herein in other sections. In other embodiments, moderator computers 120 and steps to moderate or examine recommended resources are omitted, and recommended resources can be shared with users essentially as direct results of machine learning model output via the presentation layer without an examination or moderating step. Annotation computers 105 can be associated with other end users who enter or provide labels, annotations, or other feedback concerning training data, matching recommendations of users to conversations or resources, or other annotations of data that the conversation platform instance 106, as described herein in other sections.

In one commercial implementation, the conversation platform instance 106 is programmed to facilitate discussions of mental health concerns of users of user computers 102. As noted in other sections, the techniques disclosed herein are not limited to that domain and apply to any domain of conversational commerce. Any commercial domain that can benefit from matching of conversations to resources, can use the techniques disclosed herein.

In an embodiment, user computers 102, moderator computers 120, annotation computers 110, and training data can be coupled to the conversation platform instance 106 via one or more local area networks, wide area networks, or internetworks, using any of wired or wireless, terrestrial or satellite data links.

In an embodiment, the conversation platform instance 106 comprises sequences of executable stored program instructions that are organized in the functional units, packages, and elements shown in FIG. 1 and executed or hosted using one or more virtual computing instances in a private datacenter, public datacenter, and/or cloud computing facilities. In an embodiment, the conversation platform instance 106 can be implemented as described for computer system 700 (FIG. 7). In an embodiment, the conversation platform instance 106 can include conversation manager instructions 122, a transformer-based machine learning model 124, and a group database 118.

The conversation manager instructions 122 can be programmed to accept connections from user computers 102, receive initial input and message input from user computers, prepare content input 104 for use in other elements, and manage presentation of graphical user interface elements to the user computers, as further described in other sections herein.

The group database 118 can be programmed to store data concerning conversation groups that include one or more user computers 102 or user accounts and a moderator computer 120, topics or content items associated with the groups, metadata, and control data, as further described.

Various embodiments may use neural network architectures such as BERT or Transformers; the machine learning model of FIG. 1 is described as a transformer-based machine learning model solely for the purpose of illustrating one clear example of implementation. In this embodiment, execution of the transformer-based machine learning model 124, in an inference stage based upon content input 104, can result in outputting prediction output 112. As described further in other sections, the prediction output 112 can include recommendations of groups that are conducting online conversations or chats, to which user computers 102 or user accounts should be added. The moderator computers 120 can also receive the prediction output 112 and provide feedback 126, which can be incorporated into training data 108 or which can filter or modify the prediction output before it is used.

Execution of the transformer-based machine learning model 124, in the inference stage based upon content input 104, also can produce negative data 116, representing groups or chats that are not recommended, or have lower relevance or confidence scores. The conversation platform instance 106 can be programmed to select sample data 114 from among the prediction output 112, and programmatically transfer the sample data and the negative data 116 to annotation computers 110 for labeling and contribution to the training data 108. For example, the conversation platform instance 106 can be programmed to implement data request functions, via a web-based application that the annotation computers 110 access using a browser; interaction of the annotation computers with the web-based application can cause downloading the sample data 114 and negative data 116 for labeling at the annotation computers, followed by uploading to training data 108. In this manner, the conversation platform instance 106 can implement supervised training with a feedback loop to continuously improve the quality of the transformer-based machine learning model 124.

Significantly, an architecture using transformer-based machine learning model 124 is capable of outputting classifications or recommendations that are not dependent on the use of keywords in messages of an online conversation. Instead, proper training of the model renders it capable of inferentially reaching recommendations based on the semantics of messages and implied concepts that are not explicit in the text of messages or chat conversations.

Certain embodiments are described in the context of digital electronic messages in online chat conversation systems. In this context, the terms "messages" and "posts" are interchangeable, and embodiments can be implemented in systems or contexts in which terms other than "messages" are used in those systems or contexts to refer to other kinds of digital electronic communications.

2.2 Example Process of Matching User Needs to Resources

Figure 2:
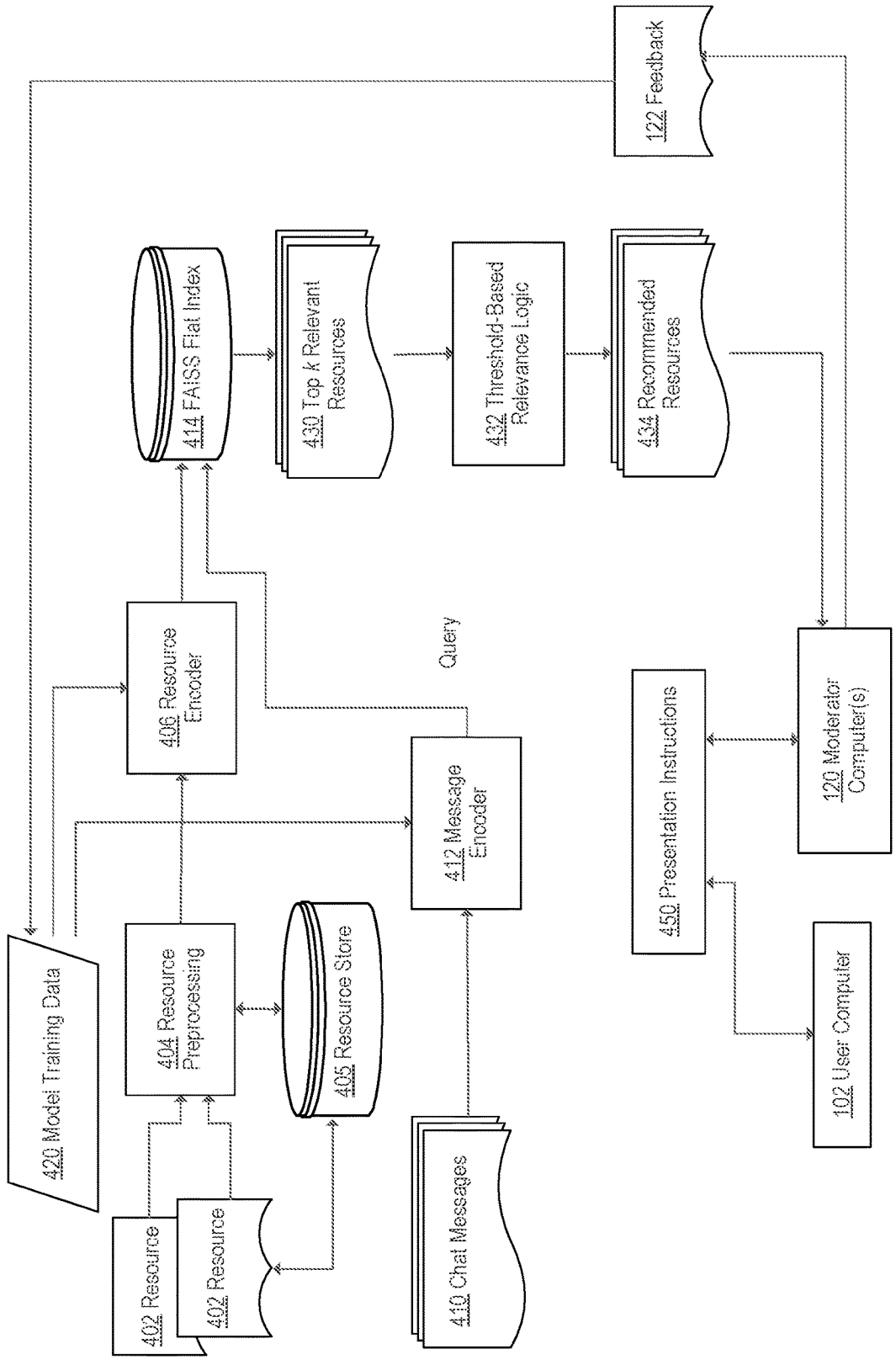
FIG. 2 illustrates examples of functional elements and a data flow for matching a chat message conversation to one or more relevant resources.
Figure 3:
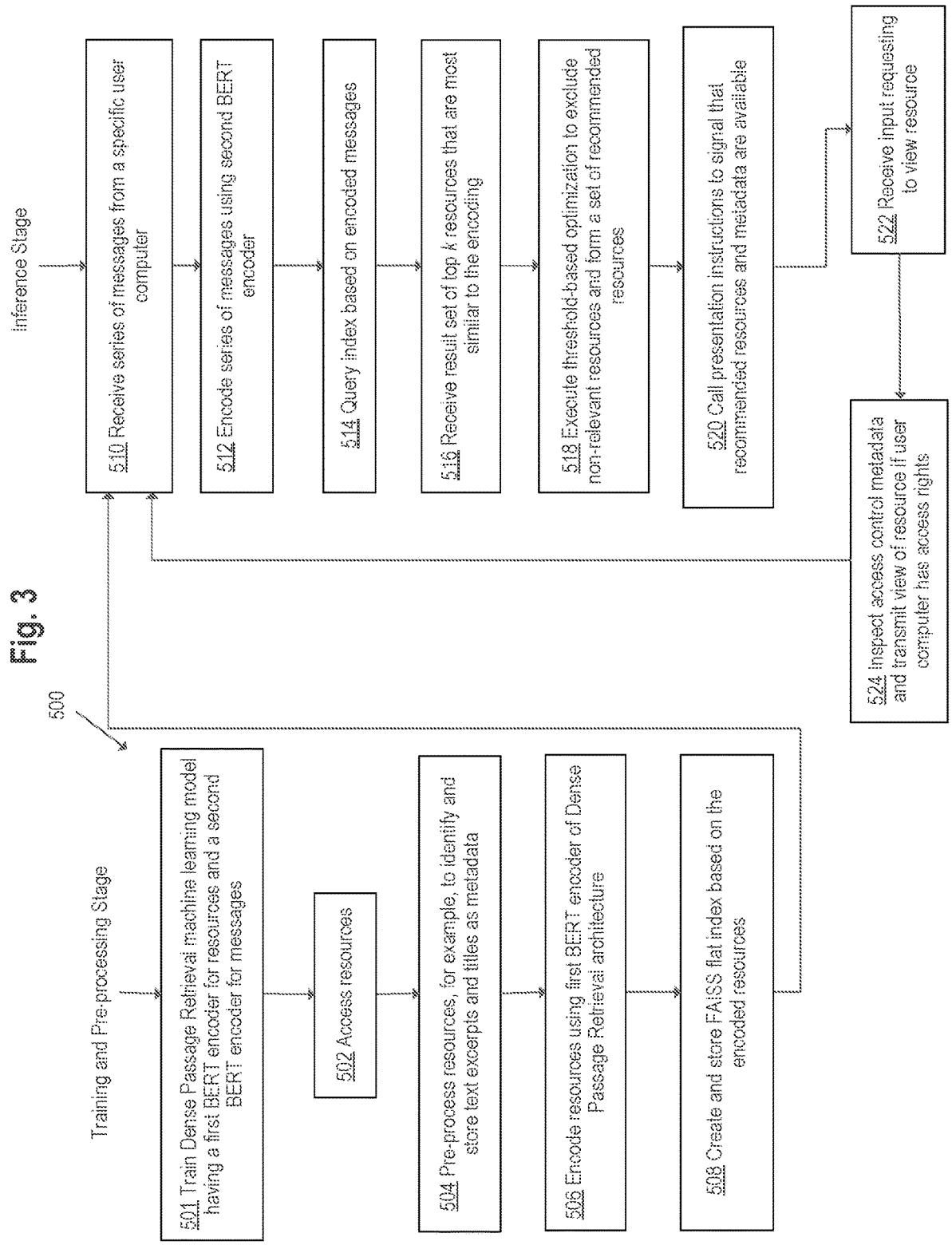
FIG. 3 is a flow diagram of an example computer-implemented process or algorithm useful in matching a chat message conversation to one or more relevant resources.
Figure 4:
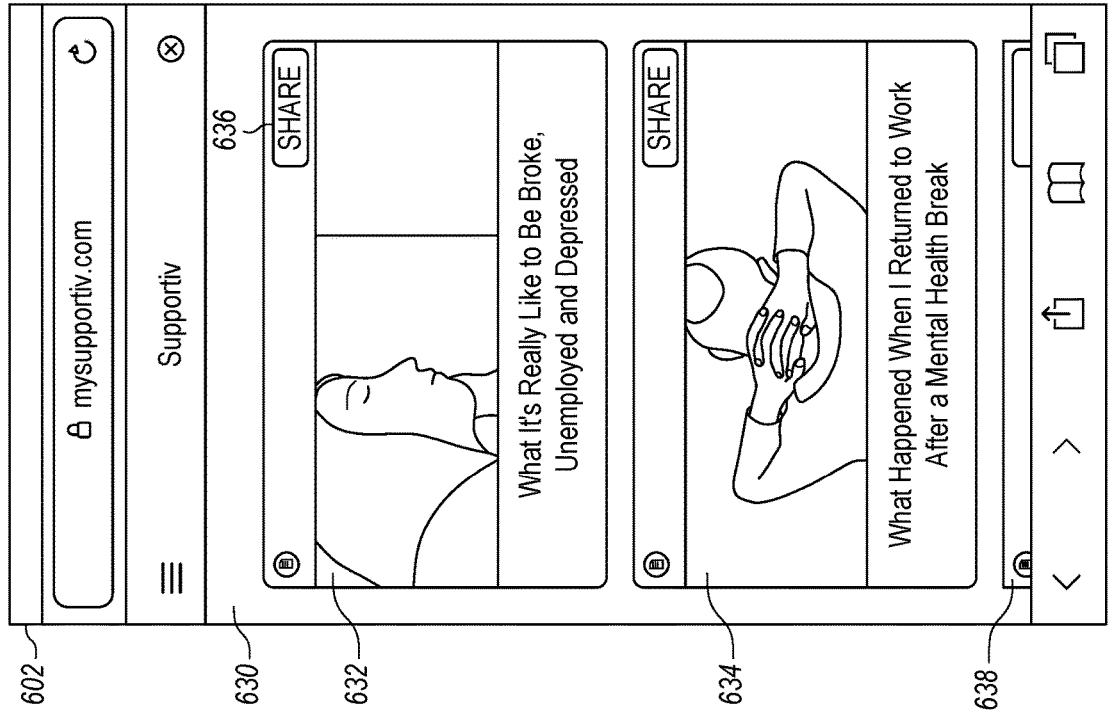
FIG. 4, FIG. 5, FIG. 6 illustrate examples of digital display devices with portions of graphical user interfaces that can be used in certain embodiments.
Figure 5:
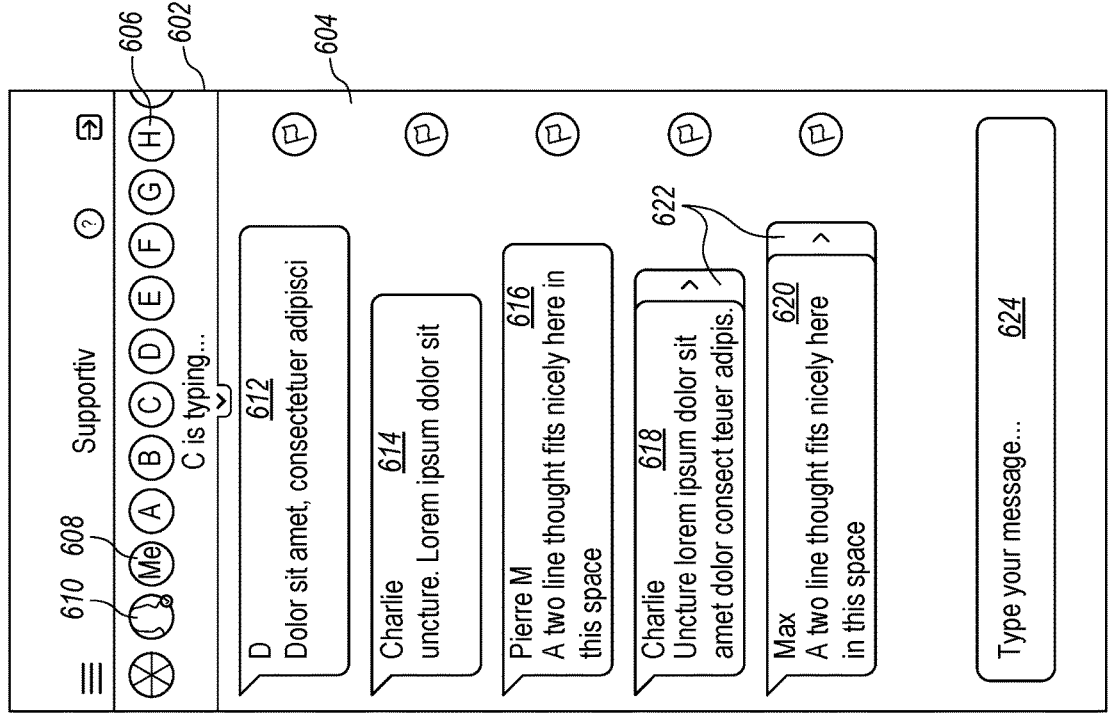
Figure 6:
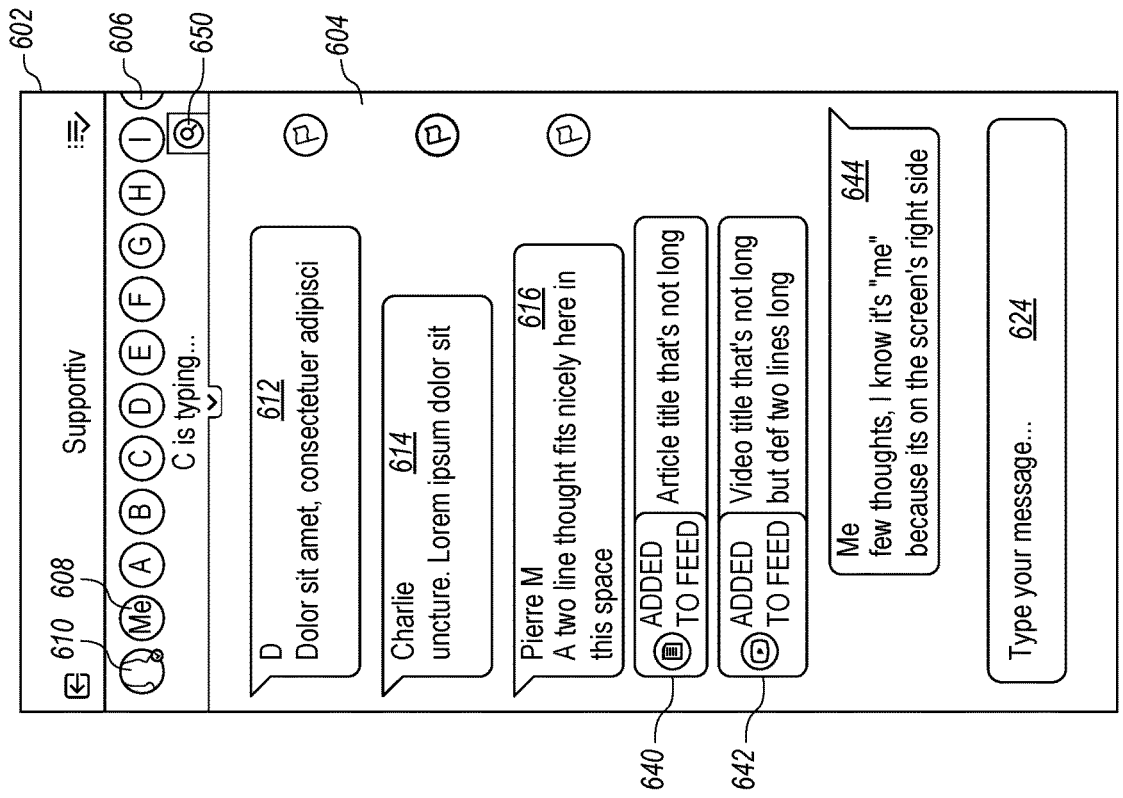

FIG. 2 illustrates examples of functional elements and a data flow for matching a chat message conversation to one or more relevant resources. FIG. 3 is a flow diagram of an example computer-implemented process or algorithm useful in matching a chat message conversation to one or more relevant resources. FIG. 4, FIG. 5, and FIG. 6 illustrate examples of digital display devices with portions of graphical user interfaces that can be used in certain embodiments.

FIG. 2 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

As an overview, during a chat session of a user computer 102 interacting with a moderator computer 120 and other peers, a user associated with the user computer may express an emotional state and/or emotional needs. To aid in resolving their emotions, conversation platform instance 106 can be programmed to match the user computer 120, during a chat conversation, with the most relevant resources from a content library, connections to service referrals, or specialized resources. In this context, resources in the content library can include articles, videos, audio content, inspirational quotes, and coping tools and exercises. Connections to service referrals can include links to specialized services that match a need of the user, such a hotline, URL for a service provider. Specialized resources can be any of the foregoing that are specifically available to the user computer 120, user account, or associated user through a sponsoring health plan, employer service, or other employer-specific benefit program.

Embodiments can be used in many different substantive domains involving different kinds of electronic digital online conversations coupled with recommendations of resources. For example, assume that a group of fans are chatting about a favorite sports team or live sporting event in an online chat system. The architecture of the present disclosure and the processes described above can execute to evaluate messages in the chat system, based on contextual understanding and not limited to keywords in the messages, and determine recommendations of links to teams, player, or event merchandise that match the expressed favorites of the users, which can be programmed to appear in the chat conversation in real-time as messages are submitted, allowing for one-click purchases of merchandise or other items.

As a second example, assume that in a chat, users submit messages that discuss how they are looking to purchase a new car, how they intend to use the car, what special features each would be looking for, desired safety features, and what audio packages are their preferences. As they chat, the architecture of the present disclosure and the processes described above can execute to identify available car inventory that meets the expanding list of noted preferences and can be programmed to add links into the conversation, for the participants to discuss and compare the merits of each make and model.

As a third example, assume that in a chat, the user expresses that their house is dirty. They further express some details, such as the types of messes that need to be cleaned. In real-time, the architecture of the present disclosure and the processes described above can execute to perform resource or product matching to this expressed need. Recommended resources or products matching the expressed need can be programmed to populate within the chat, for instance an e-commerce listing for a vacuum with wet, dry, and pet hair cleaning capabilities could appear as a hyperlink in the chat. The architecture of the present disclosure and the processes described above can execute to recognize the contextual need of the user without the user having included the keyword "vacuum."

As another example, assume that a group chat of parents talk about their children's growth milestones. The architecture of the present disclosure and the processes described above can execute to process the messages of the parents and to output recommendations of hyperlinks to products. As the users chat, hyperlinks to developmental toys appropriate for that milestone appear in the chat conversation for participants to click on, gain input from one another, and make purchases or add to personal gift registries.

As a further example, assume that a customer returning a product with the help of a customer service chatbot is engaged in a conversation about their reasons for returning the item. Before processing the return, integrated with the chatbot, architecture of the present disclosure and the processes described above can listen, interpret, and diagnose why the customer is unsatisfied with the product. Based on the customer's responses, links and resources to a product that is a better match to the customer's needs are matched into the chat, and then a product exchange is processed instead of a return.

Or, assume that a group of patients, each having recently received the same diagnosis for a chronic health condition, gather in an online discussion forum. While chatting, resources explaining their condition, possible symptoms, doctor-recommended best practices, useful products and services, and motivational content are shared as links as the conversation unfolds.

As another example, assume that a group of pregnant women discuss their challenges and experiences with their stages of pregnancy. Resources are served to them with more details on what to expect as their pregnancy progresses.

In still another example, a group of demographically similar patients could be chatting in an online chat system and could be introduced to relevant preventative health measures recommended for their cohort. For example, a group of men in their 40s are chatting and are introduced to resources detailing doctor-recommended reasons to get their cholesterol or blood pressure checked, a link to a what's-it-like video on the colonoscopy process to reduce fear and reluctance, or images of common skin changes that would warrant a doctor's examination, discussable in a friendly forum for knowledge building and encouragement.

Embodiments also can be applied to focus grouping, product prototype feedback, or product development input. For example, users intending to purchase a new car in the next year could be grouped together in an online forum, united by their common need and wanting to seek popular opinion and insider knowledge. They could submit online messages to discuss how they each intend to use the car, what special features each would be looking for, what they don't like about models currently on the market, desired safety features, and trade ideas on what engine specifications are needed and what audio packages are their preferences. The architecture of the present disclosure and the processes described above can execute to evaluate the messages based on contextual understanding. As the users chat, new care models that meet the expanding list of required specifications are linked into the conversation, for the participants to discuss the merits and drawbacks of each make and model.

Another embodiment could be configured to assist coworkers conversing online about a topic, project, or goal to recommend relevant resources from the company's file system to the group.

As another example, an embodiment could be configured to offer relevant educational material to students on a collaborative online education platform based on knowledge gaps identified in their conversation.

One approach to this issue is processing search terms explicitly. Unlike that approach, in an embodiment, conversation platform instance 106 can be programmed to use the language context and to interpret needs of users. For example, a user comes to conversation platform instance 106 expressing that he is fighting with his wife. He may not be aware that poor communication is the root cause of their struggles; he is certainly not explicitly looking for a video to help him have a more amicable and productive conversation with his wife. In an embodiment, conversation platform instance 106 can be programmed with the architecture and processes described in other sections herein to generate recommendations of targeted resources such as a video concerning marital conflicts.

Referring first to FIG. 2, in an embodiment, conversation platform instance 106 can be programmed to receive or read a plurality of resources 402, execute resource preprocessing 404 on the resources, and digitally store the resources in a resource store 405. Metadata relating to resources 402, and part or all of the content of the resources, can be encoded using resource encoder 406, which has been trained using model training data 420. Resource encoder 406 can be a transformer-based encoder; in one example embodiment, the resource encoder 406 is a BERT encoder. In an embodiment, resource store 405 comprises a relational database or other digital data store having tables of records or rows, each row corresponding to a resource and including column attributes for a resource identifier, resource type, resource title, an excerpt or snippet of text or other content from the resource, and a set of one or more access controls that specify user accounts, groups, enterprises, or entities that are allowed to access the resource represented in the row.

The resulting encodings are indexed in FAISS flat index 414. FAISS is an open-source code library that is available at the time of this writing via GITHUB and is programmed for efficient similarity search and clustering of dense vectors. It contains algorithms that search in sets of vectors of any size, up to ones that possibly do not fit in RAM. It also contains supporting code for evaluation and parameter tuning. Other recommendation systems may retrieve items in real time by employing sparse indexes, resulting from bag of word encoders such as BM25; in contrast, the neural bi-encoder approach of the present disclosure yields dense vectors. The FAISS library indexes dense vectors, allowing for better scaling, rapid response times, and GPU parallelism in production, and allows for the efficient construction and querying of indices of up to one billion dense vectors, thereby scaling by orders of magnitude with respect to standard sparse indices such as SOLR or LUCENE.

In an embodiment, chat messages 410 obtained from live, ongoing chat conversations in real-time are encoded using a message encoder 412, which also has been trained using model training data 420. Message encoder 412 can be a transformer-based encoder; in one example embodiment, the message encoder 412 is a BERT encoder. The encodings of messages output from the message encoder 412 can form a query to the FAISS flat index 414; in response, the index is programmed to output the top k relevant resources 430. In an embodiment, threshold-based relevance logic is applied to the top k relevant resources 430, yielding a reduced set of recommended resources 434, which can be programmatically provided to presentation instructions 450. Messages 410 also could be asynchronous post exchanges between users occurring with significant time separation, or structured text from sources other than chat systems, and real-time, live chat messages are not required in all embodiments.

In an embodiment, the presentation instructions 450 are programmed to present the recommended resources 434, or information about them, to one of the moderator computers 120 that is associated with a chat conversation from which the chat messages 410 were obtained. The moderator computer 120 may provide a feedback signal 126 that controls presentation instructions 450 to cause presenting, or not presenting, the recommended resources 434 to user computer 102. Feedback 126 also can be transmitted to model training data 420 to update the training data for use in later rounds of training of the resource encoder 406 and/or the message encoder 412.

In an embodiment, the functional elements and data flows shown in FIG. 2 may execute processing functions according to FIG. 3. For example, a programmed process 500 can comprise a training and pre-processing stage, followed by an inference stage. In the training and pre-processing stage, at block 501, the process 500 is programmed to train a Dense Passage Retrieval (DPR) machine learning model having a first encoder for resources and a second encoder for messages.

At block 502, the process 500 is programmed to access resources, and at block 504, to pre-process the resources, for example, to identify and store text excerpts and titles as metadata in digital storage.

At block 506, the process 500 is programmed to encode the resources using the first encoder of the DPR architecture. At block 508, the process 500 is programmed to create and store a FAISS flat index based on the encoded resources.

Turning to the inference stage, at block 510, the process 500 is programmed to receive a series of messages from a specific user computer. At block 512, the process 500 is programmed to encode a series of messages using the second encoder.

At block 514, the process 500 is programmed to query the index based on the encoded messages. At block 516, the process 500 is programmed to receive a result set of the top k resources that are most similar to the encoding specified in the query. In an embodiment, at block 518, the process 500 is programmed to execute a threshold-based optimization to exclude non-relevant resources and form a set of recommended resources.

At block 520, the process 500 is programmed to call presentation instructions to signal that the recommended resources and metadata are available. At block 522, the process 500 is programmed to receive input requesting to view one of the resources. At block 524, the process 500 is programmed to inspect stored access control metadata and transmit a view of the resource if the user computer has access rights.

Unlike other approaches, the architecture of FIG. 2 encodes resources, indexes the encoded resources to make real-time retrieval from among thousands to millions of items practical, and uses a supervised technique. The architecture enables training a model on domain-specific data, while continually improving it via a feedback loop. In one implementation, the conversation platform instance 106 can be programmed via the following algorithms. Let m_i . . . m_j be a series of messages from a specific user in the platform. Let C be a collection of resources, such as content items, connections, and specialized items. The conversation platform instance 106 is programmed with two encoders E_m and E_c where E_m is an encoder for messages and E_c is an encoder for the items. All items are preprocessed before being encoded by E_c as further described in other sections herein. Both encoders are simultaneously trained by optimizing the following loss function:

$$L(q_i, p_i^+, p_{i,1}^-, \ldots, p_{i,n}^-) = -\log \frac{e^{sim(q_i, p_i^+)}}{e^{sim(q_i, p_i^+)} + \sum_{j=1}^{n} e^{sim(q_i, p_{i,j}^-)}}$$

where sim is the cosine similarity, q_i is the loss function, p_i+ is a relevant item and p_i− is an irrelevant item. In one embodiment, q_i is constructed from m_i−k . . . m_i, where k is an arbitrary number. In one embodiment, q_i is the concatenated list of m_i−k . . . m_i, and k is the largest number such that the concatenated message length does not exceed the maximum input length allowed by the transformer-based encoder. In another embodiment, q_i can be constructed by concatenating the latest messages, m_i with a label summarizing the previous messages m_i−k . . . m_i−1 sentiment. After model training, all the items are encoded with E_c and a FAISS flat index I is formed using the encoded data for content, connections, and specialized items independently. During inference, query terms are first encoded with E_m and subsequently I is queried with the encoded text and the top-k relevant content, connections, and specialized items are returned, independently.

Additionally, a threshold optimized on the development dataset is employed to determine if a resource is relevant enough to be recommended, or the system should abstain from recommending items.

Referring again to FIG. 2, block 404, in an embodiment, resource preprocessing can be programmed to divide each resource into 100-word passages, prepended with a title of the resource. Furthermore, connections and specialized items are concatenated by a list of manually curated keywords. Using preprocessing as described, recommendations are not limited to title matching. Further, the presentation of output can highlight snippets from resources. Therefore, when an article is shared with a user, the most relevant snippet can be highlighted, so the user can quickly identify the section that can help them resolve their emotional needs. More specifically, at block 516, the result set may include one or more excerpts of each of the resources, the learning model having extracted the one or more excerpts to address the plurality of message encodings. The presentation of a relevant excerpt or snippet from the resources, that the learning model has extracted to address the plurality of message encodings, can help users navigate the relevant resources by rapidly accessing and displaying relevant portions.

Programming of the elements of FIG. 2 can implement a feedback loop to continually improve the system and incorporate changes such as concept drift. In an embodiment, the conversation platform instance 106 is programmed to store, for example in resource store 405, records of data representing moderator and user interactions with recommended resources 434. For example, data representing functional operations can be stored when a moderator computer 120 transmits a recommendation of one of the recommended resources 434 to user computer 102, when a user clicked on the resource, or when a user bookmarked the resource. Feedback 126 (FIG. 1) can represent any such operation or data representing it.

Subsequently, the feedback 126 can be used in several ways. In one embodiment, if recommended resources 434 comprises n ranked recommendations and the moderator computer selects resource k of n for recommendation, then resources 1 . . . k−1 can be marked as implicitly irrelevant and data concerning those resources can be provided to model training data 420 as negative recommendations. In an embodiment, if recommended resources 434 comprises n ranked recommendations and the moderator computer selects resource k of n for recommendation, then user computer 102 selects or opens resource k, then data concerning resource k can be provided to model training data 420 as a positive recommendation. If the user computer 102 also bookmarks resource k, then then data concerning resource k can be provided to model training data 420 as a positive recommendation a second time, so as to effectively oversample it during training. In an embodiment, presentation instructions 450 of conversation platform instance 106 can be programmed to display a positive response icon and a negative response icon near a resource, when the resource is displayed; for example, "thumbs up" and "thumbs down" icons can be used. Each of the icons can be programmed as an active link, hyperlink, or selectable GUI widget. In response to a selection of either the positive response icon or the negative response icon, presentation instructions 450 can be programmed to generate a positive signal or negative signal, respectively, as feedback 126 and direct the feedback to model training data 420. This approach enables the conversation platform instance 106 to re-train recommendation models with additional data at regular intervals, thereby gradually improving accuracy and correcting past mistakes.

Resource matching, as described in the foregoing sections and FIG. 2, can be used in conversation platform instance 106 in automated real-time matching and/or manual matching, each of which is now described. In automated matching, in one embodiment, each time that a user sends a chat message, conversation platform instance 106 is programmed to automatically create a search query using the mechanics shown in FIG. 2 to yield the most relevant resources that will resolve the emotional need of the user. Each search query is formed by concatenating the most recent message to the previous messages of that same user in the same conversation, up to a maximum of t tokens, where t=64 to 512, in various embodiments, with 128 being a typical value for t. This query term is then encoded with $E\_m$ and used for querying the index I yielding the top-k relevant resources. An example of presentation of the resulting resources is now described.

Referring now to FIG. 4, in an embodiment, a computer display device 602 such as a display screen of a mobile computing device, such as user computer 102, can receive encoded display instructions from presentation instructions 450 and render a graphical user interface 604 in the display. In an embodiment, GUI 604 comprises a plurality of account icons 606 that represent user accounts and/or user computers 120 that are then-currently associated in a chat conversation. A "Me" account icon 608 represents a user of the user computer 120, and a moderator icon 610 represents a moderator of the chat conversation. In some embodiments, only the moderator icon 610 includes a reduced-size or thumbnail graphic image of a user and the other icons 606, 608 are anonymized; for example, account icons corresponding to chat participants can display a sequentially assigned letter, number, or alphanumeric combination, rather than a true image, real name, initials, or other personally identifiable information.

In an embodiment, GUI 604 comprises a plurality of chat bubbles 612, 614, 616, 618, 620, each of which comprises a text statement that represents a chat comment that a particular user has entered asynchronously. A user account can submit new chat comments by entering text in a text entry widget 624 and terminating the entry with ENTER, RETURN, or a similar input signal, which triggers. The chat bubbles 612, 614, 616, 618, 620 can identify a user account that made the associated comment using account handles, pseudonyms, or names such as "D," "Charlie," "Pierre M," "Max," as in the example of FIG. 4. In one embodiment, resources that appear in the recommended resources 434 and are associated with a confidence value that is higher than a specified or stored threshold will trigger the presentation instructions 450 to generate display instructions which, when rendered in GUI 604, cause displaying an arrow 622 near a user message. The arrow 622 is merely one example and other embodiments may use a different symbol, color, icon, or other visual graphic indication near a user message.

Referring now to FIG. 5, in an embodiment, a moderator computer 120 may provide input to select an arrow 622 (FIG. 4) and, in response, relevant resources are displayed to the moderator computer using a plurality of graphical tiles 632, 634, 638, which can comprise a streamed or scrollable set that is movable in response to gesture input such as dragging one of the tiles upward. While FIG. 5 shows three (3) graphical tiles 632, 634, 638, FIG. 5 represents only one example of a form of GUI that could be used, and other embodiments may show more or fewer graphical tiles. In an embodiment, input from the moderator computer 120 to select one of the tiles 632, 634, 638 causes, in real time, transmitting a signal to the user computer 102 that is associated with the user account of the chat bubble 612, 614, 616, 618, 620 nearest to the arrow 622 that the moderator computer selected previously. In an embodiment, each tile 632, 634, 638 further comprises a SHARE link 636 which, when selected via input from the moderator computer 120, causes transmitting a display of the resource to all user computers 102 of all user accounts associated with icons 606, 608 who are then currently participating in the chat conversation and who have access privileges for the resource.

Referring now to FIG. 6, in an embodiment, input from the moderator computer 120 to select one or more SHARE links 636 of FIG. 5 also causes generating presentation instructions to display one or more condensed tiles 640, 642, respectively representing the resources associated with the links, in the chat conversation stream to user computers and to the moderator computer. This presentation technique is used because all user accounts represented by icons 606, 608, in a given chat conversation should be struggling with similar issues, so a resource that is shared with one user account will likely benefit other users. Further, in an embodiment, the moderator can tag the user computer for which the resource is shared specifically using @ symbol. Tagging does not prevent other users to view the resource but rather signifies the relevance of a resource to a particular user.

In an embodiment, input from a user computer 102 to open a resource represented in one or more of the condensed tiles 640, 642 causes generating presentation instructions which when rendered cause highlighting the most relevant snippet of the resource, that is, the portion of the resource that had been previously encoded and indexed as described in other sections herein for FIG. 2.

As previously noted, in some instances, input from a moderator computer 120 to select a resource shown in tiles 632, 634, 638 may identify a specialized resource that is subject to security controls or the evaluation of access privileges of user accounts. In some embodiments, resources that are specialized are shared only with user computers 102 or user accounts that have authorization to receive the resources, as specified by a set of stored security controls. For example, certain resources can be limited to user accounts of users who are affiliated with a particular employer, health plan, or other entity. In an embodiment, the presentation instructions 450 are programmed to present resources in the manner of FIG. 5 only to user computers 102 of user accounts having access privileges that correspond to a set of access controls, stored in resource store 405, for the resource. For example, a moderator computer 120 could transmit input representing clicking on a specialized item intended to be shared with a subset of users, such as a connection resource that is only valid for employees of a particular enterprise; in response, that shared resource is only visible in GUI 604 to user computers for whom the resource is valid. For example, when user accounts are supported, the group database 118 could store a record or row for a user account named "Daisy164" having an access privileges column value of "Universal Exports" to identify an employer of the user account as an access group name and relevant resources will be displayed only if records for those resources in resource store 405 also have "Universal Exports" or "Daisy164" as an access control attribute.

Additionally, specialized resources are only included in the recommended resources 434 in response to a query based on chat messages from a user account that qualifies to see the resource; to implement this function, referring again to FIG. 2, the logic 432 can be programmed to filter the top k relevant resources 430 to remove resources when access privileges of the user account do not match the access controls of the resources Resource matching, as described in the foregoing sections and FIG. 2, also can be used in conversation platform instance 106 with manual matching. In an embodiment, presentation instructions 450 can be programmed to generate display instructions which when rendered as part of GUI 604 cause displaying a search icon 650 (FIG. 6). The search icon can have the visual appearance of a magnifying glass or any other useful visual article. In an embodiment, at any point during the chat conversation represented in chat bubble 612, 614, 616, the moderator computer 120 can transmit input to select the search icon 650. In response, conversation platform instance 106 is programmed to form a search query by concatenating all messages of the chat bubbles 612, 614, 616 and querying the FAISS flat index 414 of FIG. 2 to yield a new set of recommended resources 434, filtered based upon access privileges of all user accounts, and to call the presentation instructions 450 to present graphical tiles identifying the resources to the moderator computer 120. In this manner, the moderator computer 120 receives a display of the top-k most relevant content, connections and specialized resources, if any of the users qualify to see the resources.

The preceding description provides a technical solution for sharing digitally stored electronic resources in online chat conversations, capable of recommending resources with snippets or excerpts in real-time as a chat system receives messages from users. Certain examples in the description focus on healthcare and retail domains, but other embodiments can be used in connection with serving advertising of products, based on keywords or contextual understanding. Embodiments can be implemented with a moderator present, or with no moderator. The description also provides a technical solution for matching resources without depending upon keywords in messages of a conversation; instead, artificial intelligence-based models are programmed to understand the meaning and context of messages, and to recommend or match the correct resources based upon output of those models. The most relevant resources can be identified without a direction mention of a particular need as a keyword, but in other embodiments, keywords in online chat messages or conversations can form a basis of determining recommendations. Recommendations and matching can occur in real time as a chat system receives messages from users, or asynchronously in response to queries, calls, or other programmatic interaction with other applications or platforms.

6. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTPS or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTPS payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTPS or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
   using a first computer, training a dense passage retrieval machine learning model having a first encoder for resources and a second encoder for messages;
   accessing a plurality of digitally stored resources, encoding the resources using the first encoder to generate a plurality of output resource encodings, and creating and storing an index based on the output resource encodings;
   accessing the resources to identify two or more of resource identifiers, resource types, text excerpts and titles of the resources as metadata items in association with records of the resources;
   receiving, from a second computer, a series of messages of an online chat conversation, and encoding the series of messages using the second encoder to output a plurality of message encodings including performing the encoding using two or more of the resource identifiers, resource types, text excerpts and titles of the resources and the first encoder to generate the plurality of output resource encodings;
   forming a search query using the plurality of message encodings and querying the index using the search query;
   receiving a result set that identifies a set of relevant resources that are most similar to the plurality of message encodings;
   forming and transmitting display instructions which, when rendered using the second computer, cause the second computer to present the relevant resources.

2. The computer-implemented method of claim 1, further comprising, before forming and transmitting the display instructions, executing a threshold-based optimization to exclude non-relevant resources and output a set of recommended resources.

3. The computer-implemented method of claim 1, the index being a FAISS flat index.

4. The computer-implemented method of claim 1, further comprising:
   receiving input from a moderator computer, the input identifying a set of recommended resources based on the relevant resources;
   forming and transmitting the displaying instructions which, when rendered using the second computer, cause the second computer to present the set of recommended resources based on the relevant resources.

5. The computer-implemented method of claim 4, each of the resources being stored in association with one or more access controls, and further comprising causing the displaying the second graphical tile only when the second computer is associated with at least one access control privilege that matches one or more of the access controls of the one resource.

6. The computer-implemented method of claim 1, further comprising:
   using a first computer, operating a plurality of different online chat conversations, each of the online chat conversations being associated with different third computers, each of the online chat conversations being associated with two or more content items;
   forming and transmitting display instructions which, when rendered using the moderator computer, cause the moderator computer to display, on a first display device of the moderator computer and near a particular message among the series of messages of the online chat conversation, a visual graphic indication that a particular resource is available;
   receiving, from the moderator computer, first input signaling a first selection of the visual graphic indication, and in response thereto, causing displaying one or more first graphical tiles on the first display device, each of the graphical tiles representing one resource in the set of recommended resources;
   receiving, from the moderator computer, second input signaling a second selection one of the graphical tiles, and in response thereto, causing displaying, on a second display device of the second computer and near a particular message among the series of messages of the online chat conversation, a second graphical tile representing the one resource in the set of recommended resources.

7. The computer-implemented method of claim 1, the series of messages being associated with an online chat conversation comprising content identifying one or more personal struggles.

8. The computer-implemented method of claim 1, the series of messages being associated with an online chat conversation comprising 64 to 512 messages that were input by the second computer.

9. The computer-implemented method of claim 1, each of the encoders comprising a transformer-based encoder or a BERT encoder.

10. The computer-implemented method of claim 1, the result set including one or more excerpts of each of the resources, the learning model having extracted the one or more excerpts to address the plurality of message encodings.

11. The computer-implemented method of claim 1, the result set including one or more excerpts of each of the resources, the learning model having extracted the one or more excerpts to address the plurality of message encodings.

12. One or more non-transitory computer-readable storage media storing one or more sequences of instructions which, when executed using one or more processors, cause the one or more processors to execute:
   using a first computer, training a dense passage retrieval machine learning model having a first encoder for resources and a second encoder for messages;
   accessing a plurality of digitally stored resources, encoding the resources using the first encoder to generate a plurality of output resource encodings, and creating and storing an index based on the output resource encodings;
   accessing the resources to identify two or more of resource identifiers, resource types, text excerpts and titles of the resources as metadata items in association with records of the resources;

receiving, from a second computer, a series of messages of an online chat conversation, and encoding the series of messages using the second encoder to output a plurality of message encodings including performing the encoding using two or more of the resource identifiers, resource types, text excerpts and titles of the resources and the first encoder to generate the plurality of output resource encodings;

forming a search query using the plurality of message encodings and querying the index using the search query;

receiving a result set that identifies a set of relevant resources that are most similar to the plurality of message encodings;

forming and transmitting display instructions which, when rendered using the second computer, cause the second computer to present the relevant resources.

13. The one or more non-transitory computer-readable storage media of claim 12, further comprising one or more sequences of instructions which, when executed using the one or more processors, cause the one or more processors to execute, before forming and transmitting the display instructions, executing a threshold-based optimization to exclude non-relevant resources and output the set of recommended resources.

14. The one or more non-transitory computer-readable storage media of claim 13, each of the resources being stored in association with one or more access controls, and further comprising one or more sequences of instructions which, when executed using the one or more processors, cause the one or more processors to execute causing the displaying the second graphical tile only when the second computer is associated with at least one access control privilege that matches one or more of the access controls of the one resource.

15. The one or more non-transitory computer-readable storage media of claim 12, the index being a FAISS flat index.

16. The one or more non-transitory computer-readable storage media of claim 15, the result set including one or more excerpts of each of the resources, the learning model having extracted the one or more excerpts to address the plurality of message encodings.

17. The one or more non-transitory computer-readable storage media of claim 12, further comprising one or more sequences of instructions which, when executed using the one or more processors, cause the one or more processors to execute:

receiving input from a moderator computer, the input identifying a set of recommended resources based on the relevant resources;

forming and transmitting the display instructions which, when rendered using the second computer, cause the second computer to present the set of recommended resources based on the relevant resources.

18. The one or more non-transitory computer-readable storage media of claim 17, further comprising one or more sequences of instructions which, when executed using the one or more processors, cause the one or more processors to execute:

using a first computer, operating a plurality of different online chat conversations, each of the online chat conversations being associated with different third computers, each of the online chat conversations being associated with two or more content items;

forming and transmitting display instructions which, when rendered using the moderator computer, cause the moderator computer to display, on a first display device of the moderator computer and near a particular message among the series of messages of the online chat conversation, a visual graphic indication that a particular resource is available;

receiving, from the moderator computer, first input signaling a first selection of the visual graphic indication, and in response thereto, causing displaying one or more first graphical tiles on the first display device, each of the graphical tiles representing one resource in the set of recommended resources;

receiving, from the moderator computer, second input signaling a second selection one of the graphical tiles, and in response thereto, causing displaying, on a second display device of the second computer and near a particular message among the series of messages of the online chat conversation, a second graphical tile representing the one resource in the set of recommended resources.

19. The one or more non-transitory computer-readable storage media of claim 12, the series of messages being associated with an online chat conversation comprising content identifying one or more personal struggles.

20. The one or more non-transitory computer-readable storage media of claim 12, the series of messages being associated with an online chat conversation comprising 64 to 513 messages that were input by the second computer.

21. The one or more non-transitory computer-readable storage media of claim 12, each of the encoders comprising a transformer-based encoder or a BERT encoder.

22. The one or more non-transitory computer-readable storage media of claim 12, the result set including one or more excerpts of each of the resources, the learning model having extracted the one or more excerpts to address the plurality of message encodings.

* * * * *